United States Patent
Moriyama (10) Patent No.: US 9,813,002 B2
(45) Date of Patent: Nov. 7, 2017

(54) MOTOR CONTROLLER AND TURBO-MOLECULAR PUMP

(71) Applicant: SHIMADZU CORPORATION, Kyoto (JP)

(72) Inventor: Nobuhiko Moriyama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 481 days.

(21) Appl. No.: 14/457,216

(22) Filed: Aug. 12, 2014

(65) Prior Publication Data
US 2015/0064024 A1 Mar. 5, 2015

(30) Foreign Application Priority Data

Aug. 30, 2013 (JP) .................................. 2013-179613

(51) Int. Cl.
*F04D 19/04* (2006.01)
*H02P 7/06* (2006.01)
(Continued)

(52) U.S. Cl.
CPC .............. *H02P 7/06* (2013.01); *F04D 19/042* (2013.01); *F04D 27/0261* (2013.01);
(Continued)

(58) Field of Classification Search
CPC . H02P 6/18; G05B 2219/37481; F25B 49/025
See application file for complete search history.

(56) References Cited

U.S. PATENT DOCUMENTS 6,184,640 B1* 2/2001 Kawashima .............. H02P 1/04
310/48
7,514,896 B2* 4/2009 Imura ..................... H02P 6/182
318/400.2
(Continued)

FOREIGN PATENT DOCUMENTS

CN 103104512 A 5/2013
JP 10-174488 6/1998
(Continued)

OTHER PUBLICATIONS

English translation of Chinese Office Action dated Sep. 28, 2016 for corresponding Chinese Application No. 201410320314.X.
(Continued)

*Primary Examiner* — Patrick Hamo
(74) *Attorney, Agent, or Firm* — Renner Otto Boisselle & Sklar, LLP (57) ABSTRACT

A motor controller comprises: a rotation angle estimation unit for estimating and computing a rotation angle of a motor repeatedly based on the current and voltage of the motor without using a motor rotation angle detector; a speed calculation unit for calculating the period of the signal waveform of the rotation angle that is repeatedly estimated and calculated by the rotation angle estimation unit and for calculating an actual rotational speed of the motor based on the period; a drive signal generating unit for generating a drive signal to drive and control the motor based on at least a deviation between the actual rotational speed and a target rotational speed and the rotation angle; and a switching circuit that is switched based on the drive signal to provide drive power to the motor.

4 Claims, 5 Drawing Sheets

(51) Int. Cl.
     *F04D 27/02*    (2006.01)
     *H02P 21/04*    (2006.01)
     *H02P 21/18*    (2016.01)
(52) U.S. Cl.
     CPC .............. *H02P 21/04* (2013.01); *H02P 21/18* (2016.02); *H02P 2203/03* (2013.01)

(56) References Cited

U.S. PATENT DOCUMENTS

| 9,157,443 | B2 | 10/2015 | Tsutsui |
| 2004/0104704 | A1 | 6/2004 | Hirono |
| 2010/0188103 | A1* | 7/2010 | Takai ................... G05B 21/02 324/613 |
| 2012/0068659 | A1 | 3/2012 | Seto et al. |
| 2012/0200246 | A1* | 8/2012 | Li .......................... H02P 23/14 318/400.34 |

FOREIGN PATENT DOCUMENTS

| JP | 2003-111465 | 4/2003 |
| JP | 2004-187407 | 7/2004 |
| JP | 2004-297861 | 10/2004 |
| JP | 2005-323488 | 11/2005 |
| JP | 2007-097263 | 4/2007 |
| JP | 2010-269070 | 12/2010 |
| JP | 2011-196995 | 10/2011 |
| JP | 2013-108454 | 6/2013 |

OTHER PUBLICATIONS

English translation of Chinese Office Action dated Apr. 21, 2017 for corresponding Chinese Application No. 201410320314.X.
Office Action for corresponding Japanese Patent Application No. 2013-179613, dated Jul. 25, 2017 (English Translation).

* cited by examiner

MOTOR CONTROLLER AND TURBO-MOLECULAR PUMP

FIELD OF THE INVENTION

The present invention relates to a controller for a motor controlled without using a sensor and a turbo-molecular pump using the controller.

BACKGROUND OF THE INVENTION

In order to rotate a brushless DC motor, the rotation angle of the rotor (i.e., pole position) needs to be accurately detected or estimated. Two methods for driving a motor are conventionally known: One method detects a rotation angle using a rotation angle detection device such as a Hall element and drives the motor, and the other method estimates a rotation angle without using a rotation angle detection device, i.e., in a "sensorless" manner and drives the motor. In recent years, arithmetic devices such as a high-speed and high-performance microcomputer or a high-speed arithmetic processing unit (DSP) are available at a low cost, and a method for driving a motor in a sensorless manner is becoming common.

The method for driving a motor in a sensorless manner estimates a rotation angle based on constants such as a coil resistance and a coil inductance, a voltage applied to the coil and a current flowing through the coil, etc., and also calculates a rotational speed from the rotation angle. However, in practice, the values of the coil resistance and coil inductance are not stable and these values are not a constant in the strict sense. Accordingly, if an error occurs between a value that is set as a constant and an actual value, a problem arises that the rotation angle and the rotational speed cannot be estimated accurately, in particular in a low-speed rotation range.

JP 2007-97263 A discloses an invention that eliminates an operational complexity which may occur in a sensorless control.

However, a motor needs to be controlled by accurately estimating and calculating a rotation angle of the motor even in the low-speed rotation range.

SUMMARY OF THE INVENTION

A motor controller comprises: a rotation angle estimation unit for estimating and computing a rotation angle of a motor repeatedly based on the current and voltage of the motor without using a motor rotation angle detector; a speed calculation unit for calculating the period of the signal waveform of the rotation angle that is repeatedly estimated and calculated by the rotation angle estimation unit and for calculating an actual rotational speed of the motor based on the period; a drive signal generating unit for generating a drive signal to drive and control the motor based on at least a deviation between the actual rotational speed and a target rotational speed and the rotation angle; and a switching circuit that is switched based on the drive signal to provide drive power to the motor.

The speed calculation unit comprises a binarization unit for binarizing the signal of the rotation angle obtained by the rotation angle estimation unit, and a calculator for calculating the period based on the binary signal obtained by the binarization unit.

The motor controller further comprises: a setting unit for setting a target rotational speed of the motor; a d-axis/q-axis voltage calculation unit for calculating a d-axis voltage and a q-axis voltage based on a deviation between the target rotational speed set by the setting unit and the actual rotational speed calculated by the speed calculation unit; and a two-phase to three-phase conversion unit for converting the d-axis voltage and q-axis voltage into three-phase a-axis voltage, b-axis voltage, and c-axis voltage. The drive signal generating unit generates the drive signal based on the a-axis voltage, b-axis voltage, and c-axis voltage obtained by the two-phase to three-phase conversion unit and sends the drive signal to the switching circuit, and the rotation angle estimation unit estimates and calculates the rotation angle of the motor repeatedly based on a d-axis current and a q-axis current computed from the current of the motor driven in response to the drive signal, a d-axis voltage and a q-axis voltage calculated from the voltage of the motor, and the actual rotational speed.

The motor controller further comprises: a low-pass filter for removing the high-frequency components of the actual rotational speed calculated, and a differentiator that calculates a difference between the actual rotational speed whose high-frequency components have been removed by the low-pass filter and the target rotational speed.

A turbo-molecular pump comprises: a rotor assembly having a shaft and a rotor provided with rotor blades; a stator blade disposed in a spaced relationship with each of the rotor blades; a motor for rotating the rotor assembly; and the motor controller.

According to the present invention, a stable rotation speed can be calculated by a simple control system even in a low-speed rotation range and this enables a motor to be driven and controlled with a high accuracy. The accuracy and responsiveness of a sensorless turbo-molecular pump during a low speed can also be increased.

DETAILED DESCRIPTION OF THE PREFERRED EMBODIMENT

Figure 1:
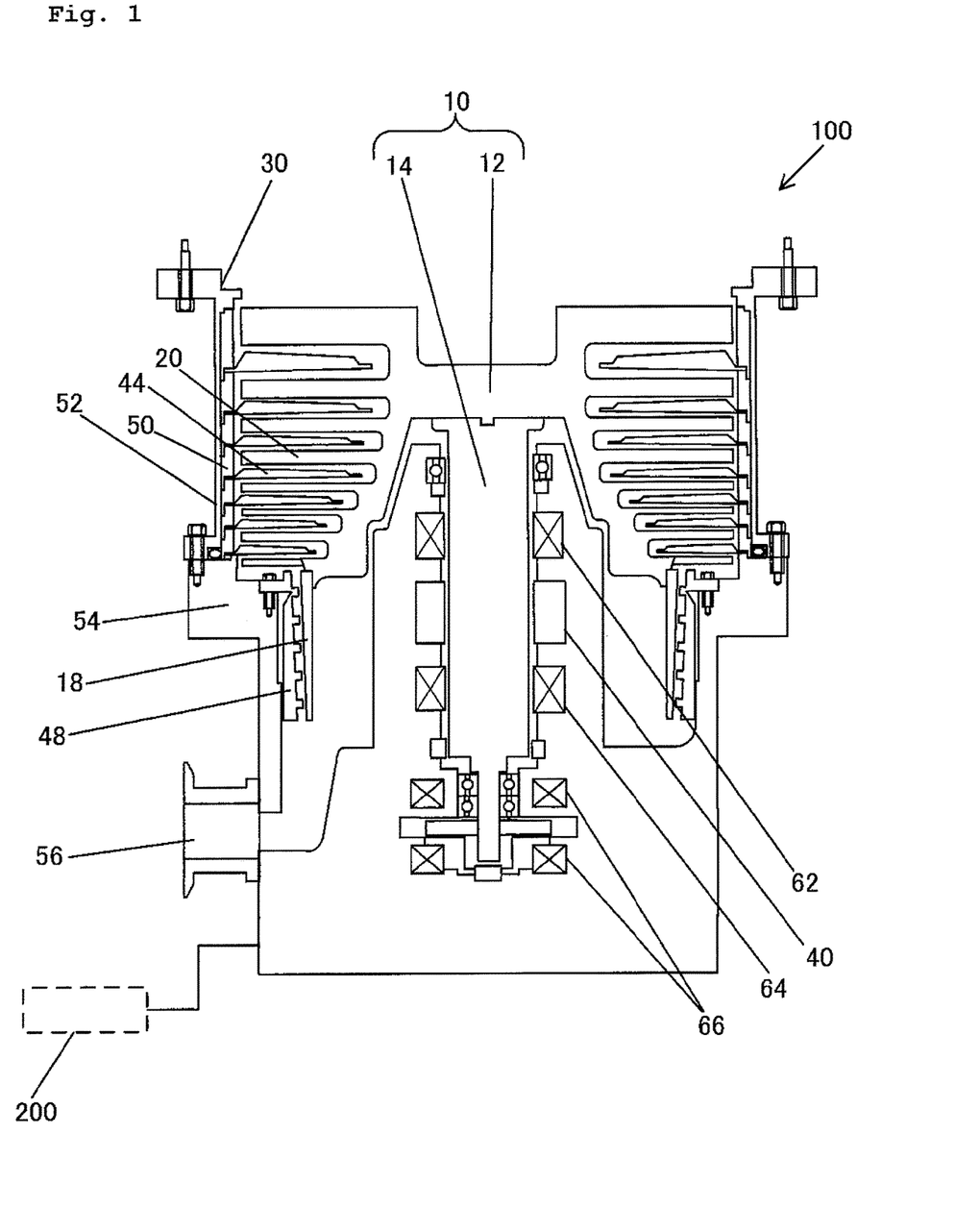
FIG. 1 is a cross-sectional view of a turbo-molecular pump of the invention.

FIG. 1 is a cross-sectional view showing the schematic configuration of a turbo-molecular pump 100. A rotor assembly 10 is rotatably mounted in a casing 52 of the turbo-molecular pump 100. The turbo-molecular pump 100 is a magnetic bearing type pump, and the rotor assembly 10 is supported contactlessly by an upper radial electromagnet 62, a lower radial electromagnet 64, and a thrust electromagnet 66.

The rotor assembly 10 has a rotor 12 and a shaft 14. The rotor 12 is provided with a plurality of stages of rotor blades 20 and a cylindrical portion 18. A plurality of stages of stator blades 44 are axially arranged between the respective rotor blades 20, and a screw stator 48 is provided to the outer periphery of the cylindrical portion 18. The stator blades 44 are disposed on a base 54 via respective spacers 50. When the casing 52 is secured to the base 54, stacked spacers 50 are held between the base 54 and the casing 52 and the stator blades 44 are positioned.

The turbo-molecular pump 100 is connected to a motor controller 200. Alternatively, the motor controller 200 may be integrated into the turbo-molecular pump 100. The motor controller 200 is to control a DC motor 40 (DC brushless motor 40, hereinafter referred to just as a "motor 40") for rotating the rotor assembly 10.

The base 54 is provided with an outlet 56, to which a back pump is connected. While being magnetically levitated by the upper radial electromagnet 62, the lower radial electromagnet 64, and the thrust electromagnet 66, the rotor assembly 10 is rotated at a high speed by the motor 40 so that gas molecules on the inlet 30 side are discharged to the outlet 56 side.

Figure 2:
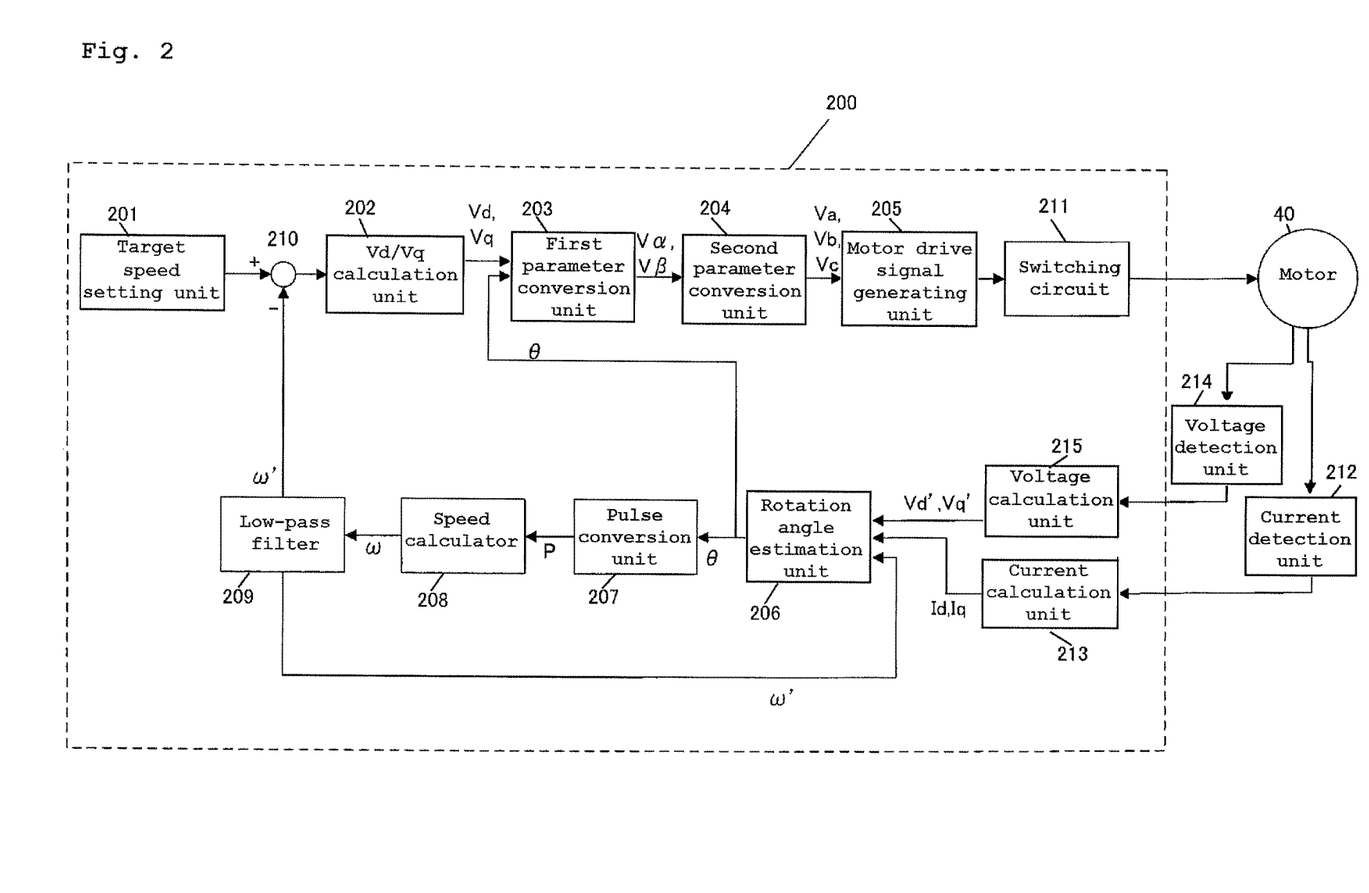
FIG. 2 is a system block diagram of a motor controller of the invention.

FIG. 2 is a system configuration diagram mainly showing the motor controller 200 of the invention. The motor controller 200 includes a target speed setting unit 201, a Vd/Vq calculation unit 202, a first parameter conversion unit 203, a second parameter conversion unit 204, a motor drive signal generating unit 205, a switching circuit 211, a rotation angle estimation unit 206, a pulse conversion unit 207, a speed calculator 208, a low-pass filter 209, and a comparison element (differentiator) 210. The motor controller 200 of an embodiment according to the invention is mainly characterized by being provided with the pulse conversion unit 207 and the speed calculator 208. The rotation angle estimation unit 206, the pulse conversion unit 207, and the speed calculator 208 will now be described with reference to FIGS. 2 and 3.

In FIG. 2, the switching circuit 211 constituted of IGBT, for example, is driven by a motor drive signal generated by the motor drive signal generating unit 205 and converts DC voltage into AC voltage to drive the motor. Reference numeral 212 denotes a current detection unit for detecting a current flowing through the coil of the motor. While the current is typically detected by a shunt resistor provided in a motor drive circuit, any means will be used in the invention. Reference numeral 213 denotes a current calculation unit for calculating a d-axis current Id and a q-axis current Iq based on the current detected by the current detection unit 212. Reference numeral 214 denotes a voltage detection unit for detecting a voltage applied across the coil of the motor. While the voltage is typically detected by divider resistors provided in a motor drive circuit, any means will be used in the invention. Reference numeral 215 denotes a voltage calculation unit for calculating a d-axis voltage Vd' and a q-axis voltage Vq' based on the voltage detected by the voltage detection unit 214.

The target speed setting unit 201 sets a target rotational speed. The comparison element 210 compares an actual rotational speed ω' (hereinafter also referred to as a "rotational speed ω'") from the low-pass filter 209 described later with the target rotational speed. The Vd/Vq calculation unit 202 calculates a d-axis voltage Vd and a q-axis voltage Vq based on the result of the above comparison. If the actual rotational speed ω' is more than the target rotational speed, the d-axis voltage Vd and q-axis voltage Vq are reduced; if the actual rotational speed ω' is less than the target rotational speed, the d-axis voltage Vd and q-axis voltage Vq are increased. If the actual rotational speed ω' is equal to the target rotational speed, the current d-axis voltage Vd and q-axis voltage Vq are maintained. That is, the Vd/Vq calculation unit 202 outputs the voltage Vd and voltage Vq in the d-q coordinate system.

The first parameter conversion unit 203 converts the voltages Vd and Vq in the rotational orthogonal coordinate system (i.e., d-q coordinate system), which are output by the Vd/Vq calculation unit 202, to voltages Vα and Vβ in the two-axis fixed coordinate system (i.e., α-β coordinate system), respectively, using a rotation angle θ described later. The second parameter conversion unit 204 converts the voltages Vα and Vβ to voltages Va, Vb, and Vc into the three-phase fixed coordinate system (i.e., abc coordinate system). The first and second parameter conversion units 203 and 204 constitute a two-phase to three-phase conversion unit. The motor drive signal generating unit 205 generates a motor drive signal to turn on and off three-phase upper and lower arms (not shown) based on the voltages Va, Vb, and Vc in the abc coordinate system. The motor drive signal is input to the switching circuit 211, which drives the motor 40.

The rotation angle estimation unit 206 calculates and estimates the rotation angle θ of the motor 40 (i.e., rotation angle θ of the rotor assembly 10) repeatedly using an equation (3) described later, where the rotation angle θ is expressed in electrical angle (the same applies hereinafter). In order to derive the equation (3), equations (1) and (2), which are voltage equations of the motor 40, are shown as follows:

$$V_d = r \cdot I_d - \omega \cdot L_q \cdot I_q + k_E \cdot \omega \cdot \sin\theta \quad (1)$$

$$V_q = \omega \cdot L_d \cdot I_d + r \cdot I_q + k_E \cdot \omega \cdot \cos\theta \quad (2)$$

Here, r, Ld, Lq, and kE are motor constants specific to the motor 40, which are obtained by measuring the motor 40 in advance. Generally, these parameters are fixed values regardless of operating conditions. The d-axis voltage Vd' and q-axis voltage Vq' calculated by the voltage calculation unit 215 are assigned to Vd and Vq, respectively. The d-axis current Id and q-axis current Iq calculated by the current calculation unit 213 are assigned to Id and Iq, respectively. The rotational speed ω' from the low-pass filter 209 described later is assigned to ω, which is the rotational speed of the motor 40.

Solving for the rotation angle θ from the equations (1) and (2) yields the following equation (3):

$$\theta = \tan^{-1}\left(\frac{V_d - r \cdot I_d + \omega \cdot L_q \cdot I_q}{V_q - \omega \cdot L_d \cdot I_d - r \cdot I_q}\right) \quad (3)$$

Substitution of the above parameters, i.e., r, Ld, Lq, kE, Vd', Vq', Id, Iq, and ω', into the equation (3) yields the rotation angle θ.

Figure 3:
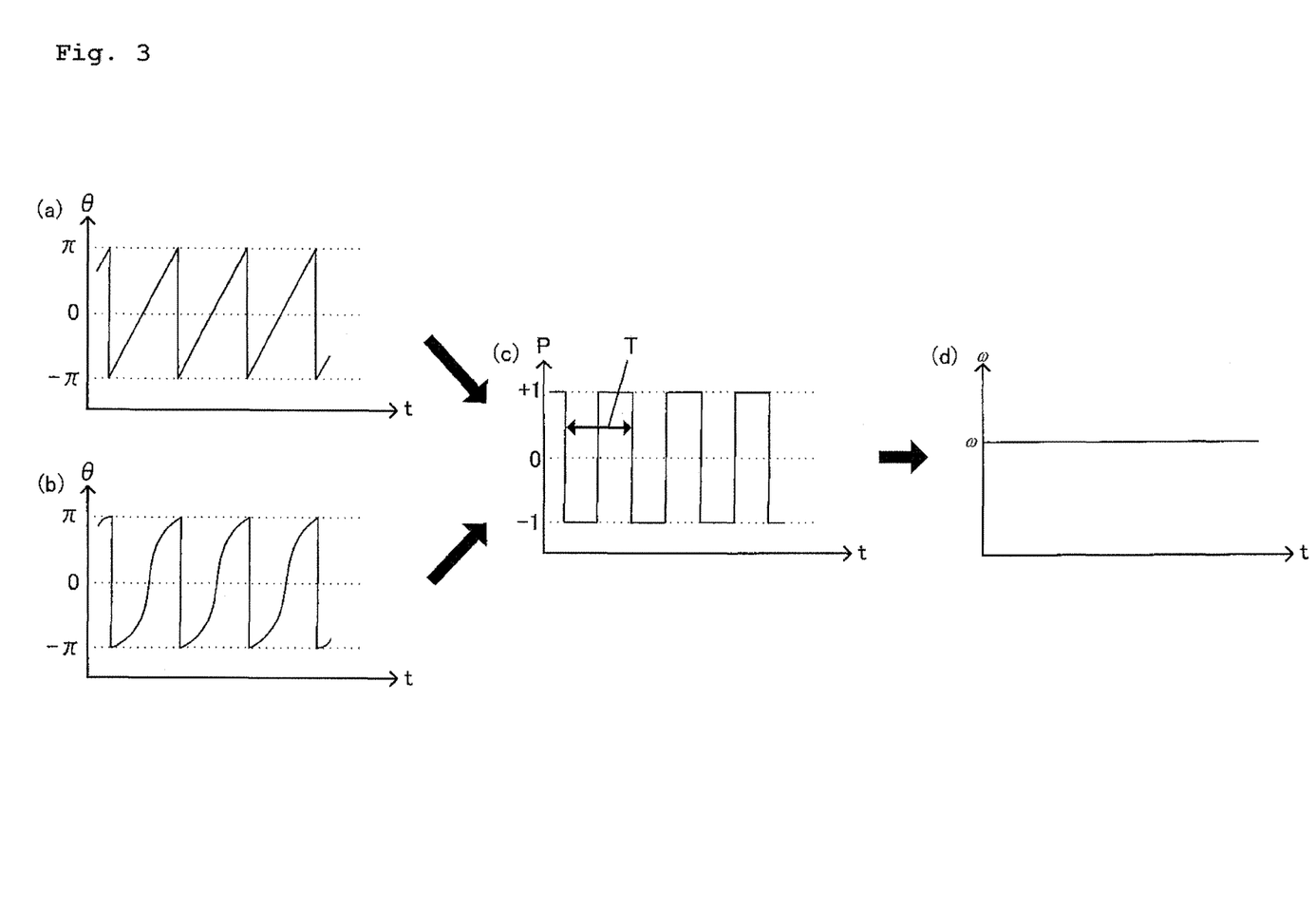
FIG. 3 is diagrams showing a method of calculating a rotational speed ω of the invention.

FIGS. 3 (a) and (b) are obtained by graphing the equation (3). Specifically, FIG. 3 (a) is a diagram showing the time dependence (signal waveform) of the rotation angle θ of the motor 40 in a high-speed rotation range estimated by the rotation angle estimation unit 206. FIG. 3 (b) is a diagram showing the time dependence (signal waveform) of the rotation angle θ of the motor 40 in a low-speed rotation range estimated by the rotation angle estimation unit 206. As described above, the rotation angle θ is expressed in electrical angle. Here, the high-speed rotation range refers to a range in which the rotational speed of the motor is higher than or equal to 70 Hz, for example; the low-speed rotation range refers to a range in which the rotational speed of the motor is lower than 70 Hz, for example. Note that since the boundary of these two ranges is different depending on the characteristics of the motor, the frequency described above is merely an example.

As described above, r, Ld, and Lq in the equations (1) to (3) are generally fixed values regardless of the operating conditions. However, in practice, the values of the resistance r and the inductances Ld, Lq are not stable and these values are not a constant in the strict sense. The high-speed rotation range is hardly affected by the instability of the above constants and the time rate of change of the rotation angle θ calculated based on the equation (3) is constant as shown in FIG. 3 (a). On the other hand, the low-speed rotation range is strongly affected by the instability of the above constants and the time rate of change of the rotation angle θ calculated based on the equation (3) is not constant as shown in FIG. 3 (b).

Problems with a rotational speed ω calculated by a conventional method based on the rotation angle θ are described later.

The pulse conversion unit 207 pulses the signal waveform of the rotation angle θ of the motor 40 output from the rotation angle estimation unit 206. Specifically, the pulse conversion unit 207 pulses the signal waveforms of the rotation angle θ shown in FIGS. 3 (a) and (b) and converts them to a pulse waveform P shown in FIG. 3 (c). A method of pulsing the signal waveform is based on zero-crossing of the rotation angle θ in FIGS. 3A and 3B, where −1 is set in the range from −π to 0 of the rotation angle θ and +1 is set in the range from 0 to π of the rotation angle θ.

While −1 and +1 are used here as binary digits, other binary digits may be used.

The pulse waveform P thus converted has a period T as shown in FIG. 3 (c). The period T is also the period of the signal waveforms of the rotation angle θ shown in FIGS. 3 (a) and (b), which are signal waveforms before being pulsed. However, pulsing makes it easy to detect the edge of the signal waveform, and as a result, the period T is easily determined. The period T is expressed in electrical angle.

The speed calculator 208 determines a rotational speed ω shown in FIG. 3 (d) based on the period T of the signal waveform P from the pulse conversion unit 207. The rotational speed ω is obtained by taking the inverse of the period T. Unlike the conventional method described later, the present invention provides a stable rotational speed ω.

Note that the pulse conversion unit 207 and the speed calculator 208 constitute a speed calculation unit.

The low-pass filter 209 eliminates high frequency noise included in the rotational speed ω output by the speed calculator 208 and outputs the rotational speed ω'. Since the rotational speed ω calculated by the conventional method is time-varying as described later, it is difficult to properly set a low-pass filter. However, the invention provides a stable rotational speed w and a suitable low-pass filter can be easily set.

While the signal waveform of the rotation angle θ is pulsed based on zero-crossing in the embodiment described above, it may be pulsed based on the point other than the zero-crossing.

Furthermore, although the above motor controller 200 determines the rotational speed ω after pulsing, the period T is also obtained from the rotation angle θ as described above so that the pulse conversion is not necessarily required. For example, it is also possible to determine the period T starting from the time when π is switched to −π in FIGS. 3 (a) and (b) to calculate the rotational speed ω.

A method of determining the rotational speed ω using the conventional method will now be described. A conventional motor controller having no pulse conversion unit 207 substitutes the rotation angle θ of the motor 40 obtained by the rotation angle estimation unit 206 into the following equation (4), temporally differentiates (temporally subtracts, in the strict sense) the rotation angle θ, and calculates the rotational speed ω.

$$\omega = \frac{d\theta}{dt} \quad (4)$$

Figure 4:
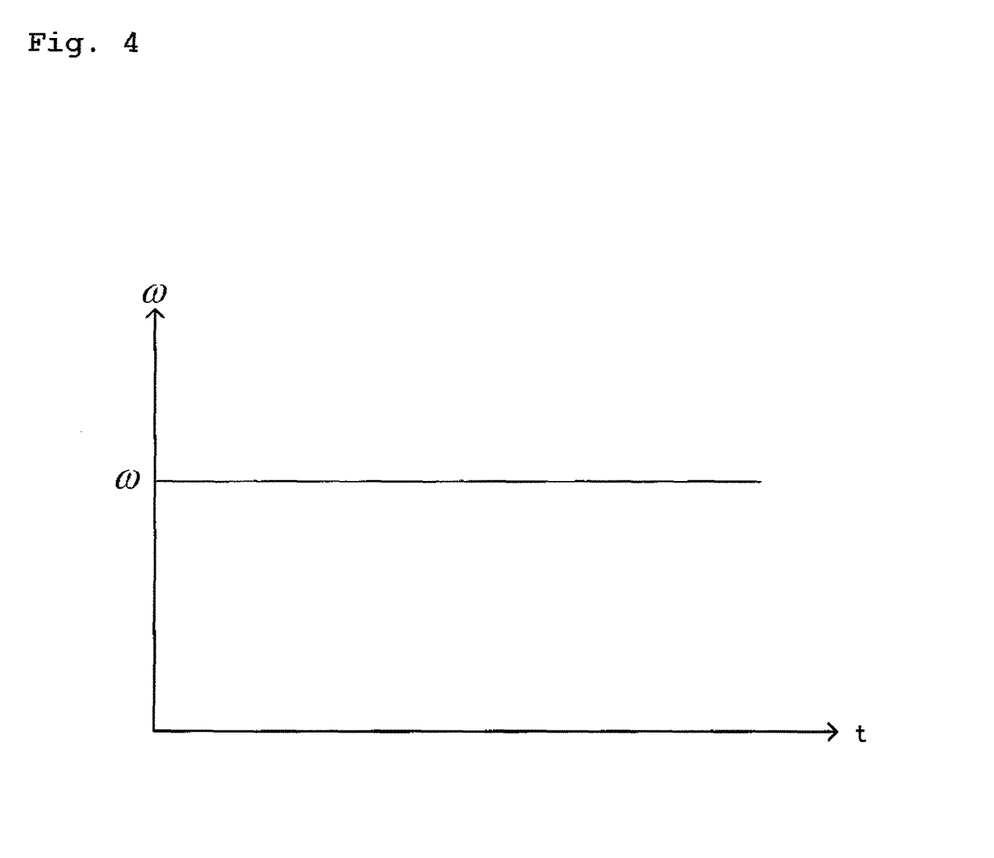
FIG. 4 is a diagram showing a rotational speed ω in a high-speed rotation range calculated by a conventional method.

FIG. 4 is a diagram showing the time dependence (signal waveform) of a rotational speed in the high-speed rotation range calculated by the conventional method. FIG. 3 (a) shows the signal waveform of the rotation angle θ output by the rotation angle estimation unit 206 in the high-speed rotation range. The waveform such as shown in FIG. 4 is obtained by temporal differentiation of the rotation angle θ shown in the equation (4). Since the time rate of change of the rotation angle θ is constant in the high-speed rotation range, the rotational speed ω obtained by temporal differentiation will be a constant value.

Figure 5:
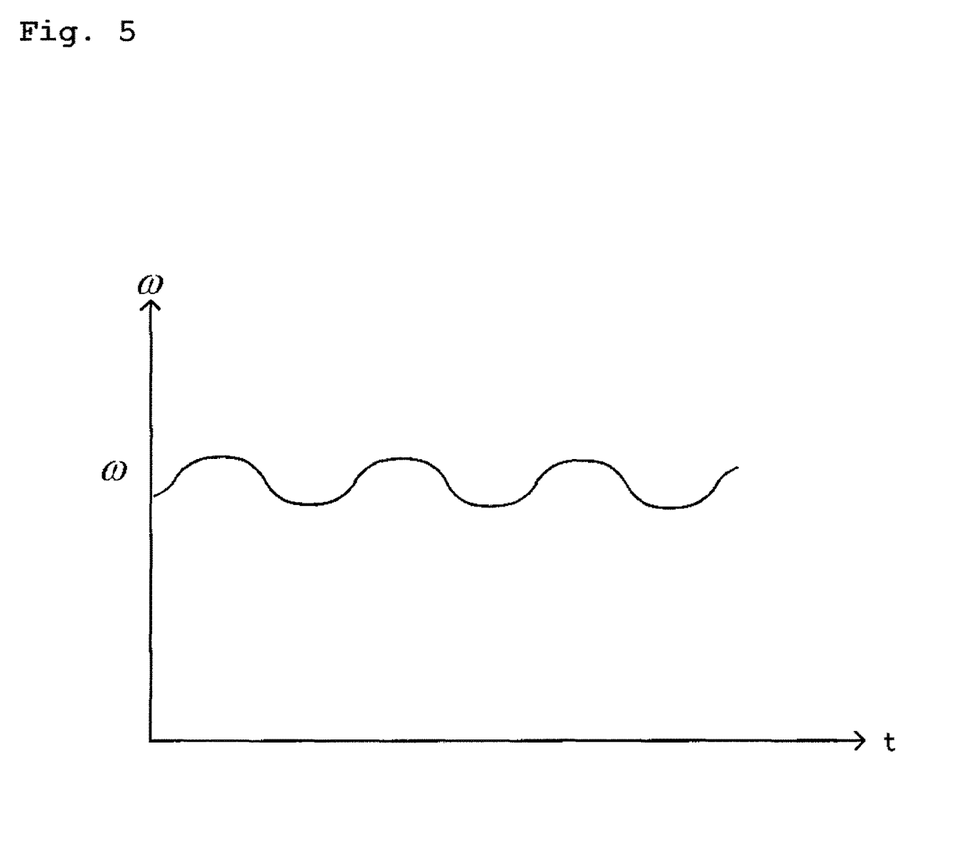
FIG. 5 is a diagram showing a rotational speed ω in a low-speed rotation range calculated by the conventional method.

FIG. 5 is a diagram showing the time dependence (signal waveform) of a rotational speed in the low-speed rotation range calculated by the conventional method. FIG. 3 (b) shows the signal waveform of the rotation angle θ output by the rotation angle estimation unit 206 in the low-speed rotation range. The waveform such as shown in FIG. 5 is obtained by temporal differentiation of the rotation angle θ shown in the equation (4). Since the time rate of change of the rotation angle θ is not constant in the low-speed rotation range, the rotational speed ω obtained by temporal differentiation will not be a constant value, i.e., will be time-varying, as shown in FIG. 5. The time variation of the rotational speed ω makes it difficult to properly set a low-pass filter 209, and as a result, the motor 40 is difficult to control.

However, in the present invention, since the rotational speed ω is not time-varying in the present invention, the rotational speed ω' can be accurately output by selecting a suitable low-pass filter 209 and a motor can be accurately driven on the basis thereof.

The motor controller 200 of the embodiment described above has the following effects:

(1) The motor controller 200 includes: the rotation angle estimation unit 206 for estimating and computing a rotation angle θ of a DC brushless motor (hereinafter referred to as a "motor") repeatedly based on the current and voltage of the motor without using a motor rotation angle detector; the speed calculation unit (207, 208) for calculating the period of the signal waveform of the rotation angle θ that is repeatedly estimated and calculated by the rotation angle estimation unit 206 and for calculating an actual rotational speed ω of the motor 40 based on the period; the drive signal generating unit 205 for generating a drive signal to drive and control the motor 40 based on at least a deviation between the actual rotational speed ω and a target rotational speed and the rotation angle θ; and the switching circuit 211 that is switched based on the drive signal to provide drive power to the motor 40.

Accordingly, as compared with the conventional method, calculating the rotational speed ω from the period T of the rotation angle θ that is repeatedly estimated and calculated reduces the time variation of the rotational speed ω that is likely to occur at a low rotational speed so that the rotational speed with a high accuracy can be obtained and the motor can be driven and controlled with a high accuracy even in a low-speed rotation range.

(2) The motor controller 200 has the speed calculation unit that includes a binarization unit, i.e., the pulse conversion unit 207, for binarizing the signal of the rotation angle θ obtained by the rotation angle estimation unit 206; and the speed calculator 208 for calculating the period T based on the binary signal obtained by the binarization unit 207. Thus, pulsing the rotation angle θ makes it easy to detect edges so that the rotational speed with a higher accuracy can be obtained and the motor can be driven and controlled with a higher accuracy.

(3) The motor controller 200 further includes: the setting unit 201 for setting a target rotational speed of the motor 40; the d-axis/q-axis voltage calculation unit 202 for calculating a d-axis voltage Vd and a q-axis voltage Vq based on a deviation between the target rotational speed set by the setting unit 201 and the actual rotational speed ω calculated by the speed calculation unit 207, 208; and the two-phase to three-phase conversion unit 203, 204 for converting the d-axis voltage Vd and q-axis voltage Vq into three-phase a-axis voltage Va, b-axis voltage Vb, and c-axis voltage Vc. The motor drive signal generating unit 205 generates the drive signal based on the a-axis voltage Va, b-axis voltage Vb, and c-axis voltage Vc obtained by the two-phase to three-phase conversion unit 203, 204 and sends the drive signal to the switching circuit 211. The rotation angle estimation unit 206 estimates and calculates the rotation angle θ of the motor repeatedly based on a d-axis current Id and a q-axis current Iq computed from the current of the motor 40 driven in response to the drive signal, a d-axis voltage Vd' and a q-axis voltage Vq' calculated from the voltage of the motor 40, and the actual rotational speed ω.

Accordingly, the motor controller of the embodiment can drive and control motors with a high accuracy even in a low-speed rotation range.

(4) The motor controller 200 further includes the low-pass filter for removing the high-frequency components of the actual rotational speed ω calculated, and the differentiator 210 calculates a difference between the actual rotational speed ω' whose high-frequency components have been removed by the low-pass filter 209 and the target rotational speed.

Thus, reducing the time variation of the rotational speed ω makes it easy to select a suitable low-pass filter 209 so that the responsiveness of a speed feedback control is improved.

(5) The motor controller 200 is used for a turbo-molecular pump. The turbo-molecular pump includes: the rotor assembly 10 having the shaft 14 and the rotor 12 provided with rotor blades; the stator blade 44 disposed in a spaced relationship with each of the rotor blades; the motor 40 for rotating the rotor assembly 10; the current detection unit 212 for detecting a current flowing through the coil of the motor 40; the voltage detection unit 214 for detecting a voltage applied across the coil of the motor 40; and the motor controller 200 described above.

Thus, the turbo-molecular pump equipped with the motor controller 200 shown in the embodiment drives and controls the motor 40 accurately, thereby enabling a stable pumping.

The above description is merely an example, and the present invention is not intended to be limited to the embodiments described above. Accordingly, the motor controller of the invention may be applied to various industrial motors other than the turbo-molecular pump.

What is claimed is:

1. A motor controller comprising:
   a rotation angle estimator estimating and computing a rotation angle of a motor repeatedly based on the current and voltage of the motor without using a motor rotation angle detector;
   a speed calculator calculating a period of a signal waveform of the rotation angle that is repeatedly estimated and calculated by the rotation angle estimator and for calculating an actual rotational speed of the motor by taking the inverse of the period of the signal waveform of the rotation angle;
   a drive signal generator generating a drive signal to drive and control the motor based on at least a deviation between the actual rotational speed and a target rotational speed and the rotation angle; and
   a switching circuit that is switched based on the drive signal to provide drive power to the motor,
   wherein the speed calculator comprises a binarization section binarizing the signal of the rotation angle obtained by the rotation angle estimator, and
   a calculator for calculating the period based on the binary signal obtained by the binarization section.

2. The motor controller according to claim 1, further comprising:
   a setter setting a target rotational speed of the motor;
   a d-axis/q-axis voltage calculator calculating a d-axis voltage and a q-axis voltage based on a deviation between the target rotational speed set by the setter and the actual rotational speed calculated by the speed calculator; and
   a two-phase to three-phase converter converting the d-axis voltage and q-axis voltage into three-phase a-axis voltage, b-axis voltage, and c-axis voltage, wherein
   the drive signal generator generates the drive signal based on the a-axis voltage, b-axis voltage, and c-axis voltage obtained by the two-phase to three-phase converter and sends the drive signal to the switching circuit, and
   the rotation angle estimator estimates and calculates the rotation angle of the motor repeatedly based on a d-axis current and a q-axis current computed from the current of the motor driven in response to the drive signal, a d-axis voltage and a q-axis voltage calculated from the voltage of the motor, and the actual rotational speed.

3. The motor controller according to claim 2, further comprising:
   a low-pass filter for removing the high-frequency components of the actual rotational speed calculated, and
   a differentiator that calculates a difference between the actual rotational speed whose high-frequency components have been removed by the low-pass filter and the target rotational speed.

4. A turbo-molecular pump comprising:
   a rotor assembly having a shaft and a rotor provided with rotor blades;
   a stator blade disposed in a spaced relationship with each of the rotor blades;
   a motor for rotating the rotor assembly; and
   the motor controller according to claim 1.

* * * * *